May 12, 1931.  N. F. HIGGINS  1,805,310
COTTON PICKER
Filed Jan. 10, 1930  7 Sheets-Sheet 1

Fig. 1.

Inventor:
Nicholas F. Higgins

May 12, 1931. N. F. HIGGINS 1,805,310
COTTON PICKER
Filed Jan. 10, 1930 7 Sheets-Sheet 4

Fig. 4.

Inventor:
Nicholas F. Higgins

May 12, 1931. N. F. HIGGINS 1,805,310
COTTON PICKER
Filed Jan. 10, 1930 7 Sheets-Sheet 6

Fig. 6.

Inventor:
Nicholas F. Higgins

Patented May 12, 1931

1,805,310

UNITED STATES PATENT OFFICE

NICHOLAS F. HIGGINS, OF CHICAGO, ILLINOIS

COTTON PICKER

Application filed January 10, 1930. Serial No. 419,889.

The present invention has to do with certain improvements in cotton-pickers and the like. The invention has to do with certain improvements in machines for travelling through the field and removing the cotton bolls from the growing plants or the plants in the field.

One object of the present invention is to provide a machine which is so constructed and arranged the bolls will be removed from the plants and delivered into a hopper or receptacle with a minimum amount of foreign matter or trash in the form of leaves, twigs, and similar material. This will correspondingly reduce the amount of work necessary to clean the cotton in subsequent operations and at the same time will correspondingly reduce the space occupied by the bolls. As a result thereof it will be possible to pick a greater amount of cotton without having to unload the carrying compartments of the machine and with corresponding increase of efficiency of operation.

Another feature of the invention relates to the provision of a cotton picker so constructed that a minimum amount of damage will be done to the plants, thereby correspondingly improving the field operation. At the same time the machine is so constructed that the plants will be very cleanly picked and the work is very efficiently performed.

Another feature of the invention relates to the provision of a construction such that the bolls of cotton are physically removed from the twigs of the plant by fingers or similar devices which actually take physical hold of the bolls; together with means for thereafter removing the bolls from said fingers or the like by the use of air currents which not only remove the bolls but carry them along and deposit them in the receptacle. It will be understood that by the use of this combination of devices the amount of air blast necessary to carry on the operation is greatly reduced since the need is only for sufficient air to remove the bolls from the fingers which are especially designed to hold them, thereafter carrying the bolls along by an air current. This reduction in the amount of air blast necessary results in a corresponding reduction in the amount of trash and foreign matter which may be picked up and carried along; and at the same time it results in a material saving in the amount of power necessary to run the machine.

In connection with the foregoing it is a further object to provide an arrangement such that the physical removal of the bolls from the plant is accomplished by the force or power coming in the first instance from the forward travel of the machine itself. This forward travel serves to actuate certain arms or similar parts which in turn cause actuation of fingers or the like which physically engage and remove the bolls from the plant. These arms and fingers are positioned at different points within the machine and over such an area or surface distribution as will insure a practically complete stripping of the bolls from all points in each plant. Each of these devices is self-contained to the extent that it operates individually on the bolls which from time to time lie in its path of travel across the field, and each time it encounters a boll during such travel it serves to remove the same in the proper manner. It thereupon resumes its normal or initial position ready for another operation.

Another feature of the invention relates to the combination of or association of the foregoing devices with machines of the general type of and arrangement disclosed in Letters Patent of the United States No. 1,711,316, issued to me April 30, 1929, for cotton pickers. In that patent there is disclosed a certain general type of construction and arrangement of machine embodying the use of air blasts and currents for removing and transporting the cotton bolls; and according to one feature of my present invention I associate certain additional devices or mechanisms with machines embodying the foregoing features.

Other objects and uses of the invention will appear from a detailed description of the same which consists in the features of construction and combinations of parts hereinafter described and claimed.

Figure 1:
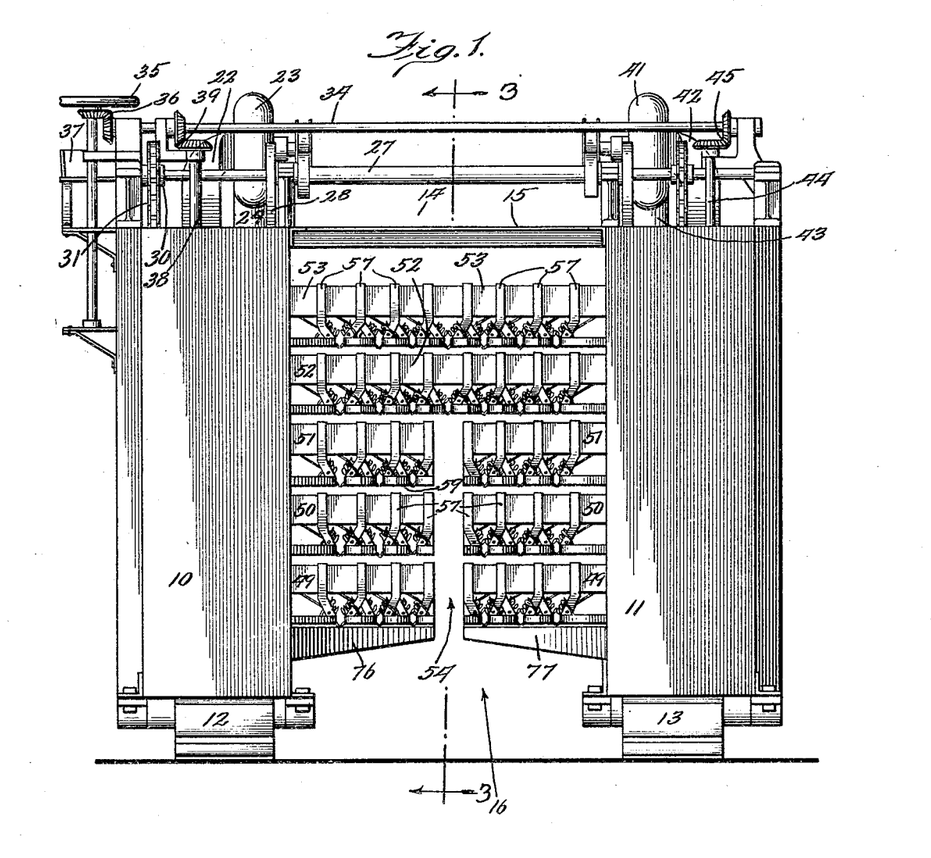
Figure 1 shows a front elevation of a machine embodying the features of the present invention.
Figure 2:
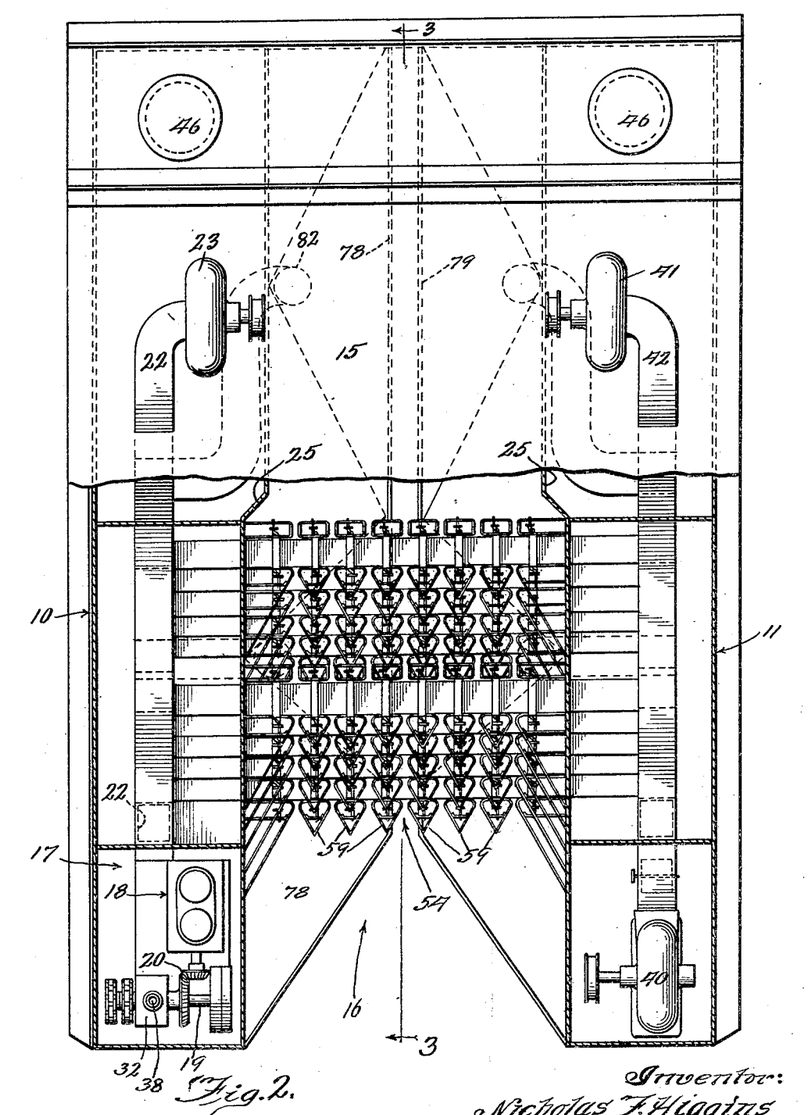
Figure 2 shows a plan view corresponding to Figure 1, but with a portion of the upper structure cut away so as to better reveal the picking mechanism.
Figure 3:
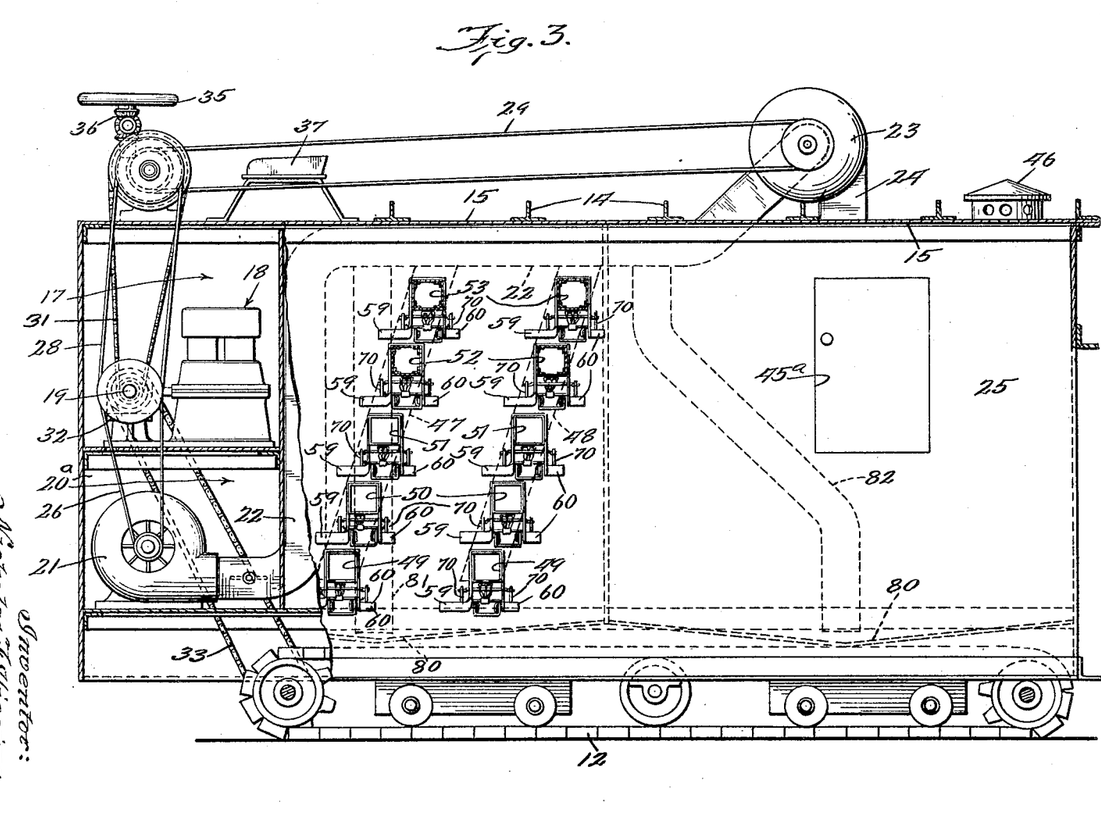
Figure 3 shows a longitudinal section substantially on the line 3—3 of Figure 1, looking in the direction of the arrows, a portion of the engine and blower compartments at one side being broken away.

Referring first to Figures 1, 2, and 3, in particular, the machine herein illustrated is what may be called a one row machine in the sense that the particular design illustrated is intended to pick the bolls from a single row of plants. It will be understood, however, that as far as the features of the present invention are concerned, they might be embodied in machines designed and intended for picking the bolls from 2, 3, or more rows of plants simultaneously.

The machine illustrated includes a pair of side sections designated 10 and 11. Each of these is self-contained in the sense that it is capable of travel along the surface of the ground on its own support, although both sections 10 and 11 are physically joined together and operated as a combined unit due to the presence of cross pieces, etc.

In the particular construction illustrated, the side sections 10 and 11 are individually supported by the track layers 12 and 13, respectively. The two side sections are connected together in their upper portions by cross members in the form of T-bars 14, and there is also a cross cover plate 15 which extends between the two sections and additionally serves to join them rigidly together.

The two sections are separated from each other such a distance as to allow the caterpillars 12 and 13 to travel in separate paths between the rows of plants. Furthermore, the two sections are unconnected in their lower portions so that there is provided a space 16 between them which accommodates the plants as the machine travels along the rows and allows the plants to be successively passed by.

The height of the cross connections between the two side sections 10 and 11 is sufficient to straddle the plants and pass over them without damage to the plants.

In the upper forward portion of the side section 10 there is a compartment or chamber 17 which accommodates a driving engine 18, preferably of the internal combustion type. This engine drives a shaft 19 through the medium of a bevel gear and pinion drive 20.

Beneath the compartment 17 there is a blower compartment $20^a$. Within the same is located a plenum blower 21 which draws air into its central portion and discharges it tangentially and through a flue 22. This flue reaches upwardly behind the compartments 17 and 20 and then rearwardly to the position of another blower 23, which is located on the cover plate 15 and in the rear portion of the machine. The flue 22 reaches into the central intake side of the blower 23; and said blower in turn delivers downwardly through a tangential connection into a flue 24 and into a large compartment 25 in the rear portion of the side section 10.

The blower 21 is driven by a belt drive 26 reaching downwardly from a pulley on the jack-shaft 19 already referred to. There is another jack-shaft 27 which extends across over the upper forward portions of the side sections 10 and 11, being suitably journaled on the cover plate. This jack-shaft 27 is in turn driven by a belt drive 28, which reaches upwards from another pulley on the jack-shaft 19.

The jack-shaft 27 in turn drives the blower 23 through the medium of a belt drive 29.

Located on the jack-shaft 27 or an extension thereof, is a sprocket 30. A chain drive 31 reaches downwardly into the compartment 17 to a change-speed box 32, located therein. From said change-speed box 32 there extends downwardly another chain drive 33 which drives the track-layer 12.

A cross shaft 34 extends across the upper forward part of the machine and can be controlled by a hand wheel 35 through the medium of a bevel gear connection 36. Said hand wheel 35 is located convenient to the driver sitting on the seat 37.

There is a vertical shaft 38 which reaches downwards into the compartment 17 and is connected into the change speed mechanism 32 so as to control the same. The shaft 38 is connected to the cross shaft 34 by a bevel gear and pinion connection 39.

By the above arrangement the motor or engine 18 serves to drive the blowers at a fixed rate of speed, but the speed of land travel of the machine may be varied.

Preferably the side section 11 is also provided with a blower 40 coresponding to the blower 21, a blower 41 corresponding to the blower 23, a flue 42 corresponding to the flue 22, a flue 43 (see Figure 1) corresponding to the flue 24, and belt drives and chain drives from the different shafts corresponding to those in the side section 10. Likewise, there is also provided in the side section 11 a vertical shaft 44 reaching downwards from the cross shaft 34 and drivingly connected thereto by bevel gears 45 in manner and purpose and function similar to the vertical shaft 38 already referred to.

The cotton bolls are removed from the plants and are delivered into the compartments such as 25 in the rear portions of the side sections 10 and 11. These compartments are of sufficient size to accommodate a considerable amount of material, sufficient for a picking operation of whatever amount is desired. Preferably the compartments 25 are also provided with doors 45$^a$ which when opened give access to their interiors so as to permit the material to be readily removed. Furthermore, it is also desirable to provide a vent-hood 46 over each of the compartments 25 so as to allow the air to easily vent through the same but preventing rain or the elements from entering.

In each of the side sections 10 and 11 there are the upwardly slanting flues 47 and 48 which reach into the corresponding flues 22 and 42. As a result thereof, these flues 47 and 48 are subjected to a suction due to the flow of air through the flues 22 and 42 respectively. Examination of Figure 3 in particular shows that these flues 48 and 47 slant towards the rear and upwardly.

There are cross or horizontal flues reaching into and communicating with the slanting flues 47 and 48. These cross or horizontal flues are located in several tiers at different consecutive elevations. The horizontal flues 49, 50, and 51, which reach into the flues 47 and 48 at the three lower-most tiers are discontinuous as shown in Figure 1 so that they do not extend clear across between the side sections 10 and 11, but rather they leave a vertical passage 54 reaching upwardly between their inner and adjacent ends. The inner ends of these horizontal flues 49, 50, and 51 are sealed.

The two upper-most cross flues 52 and 53 on the other hand extend clear across between the upper portions of the upwardly slanting flues as best shown in Figure 1.

The elevation of the cross flue 52 is such that the bulk or body portion of the plant passes beneath the same; and the main stalk and principal portion of the plant passes through the channel or space 52 as the machine travels through the field. The bolls and branches and twigs are passed and accommodated through the spaces between the horizontal flues 49, 50, and 51 principally, so that practically all portions of the plants are brought into proximity to one or more of the flues and at the same time the arrangement is such that the plant is not needlessly broken or mutilated by the travel of the machine through the field.

Figure 4:
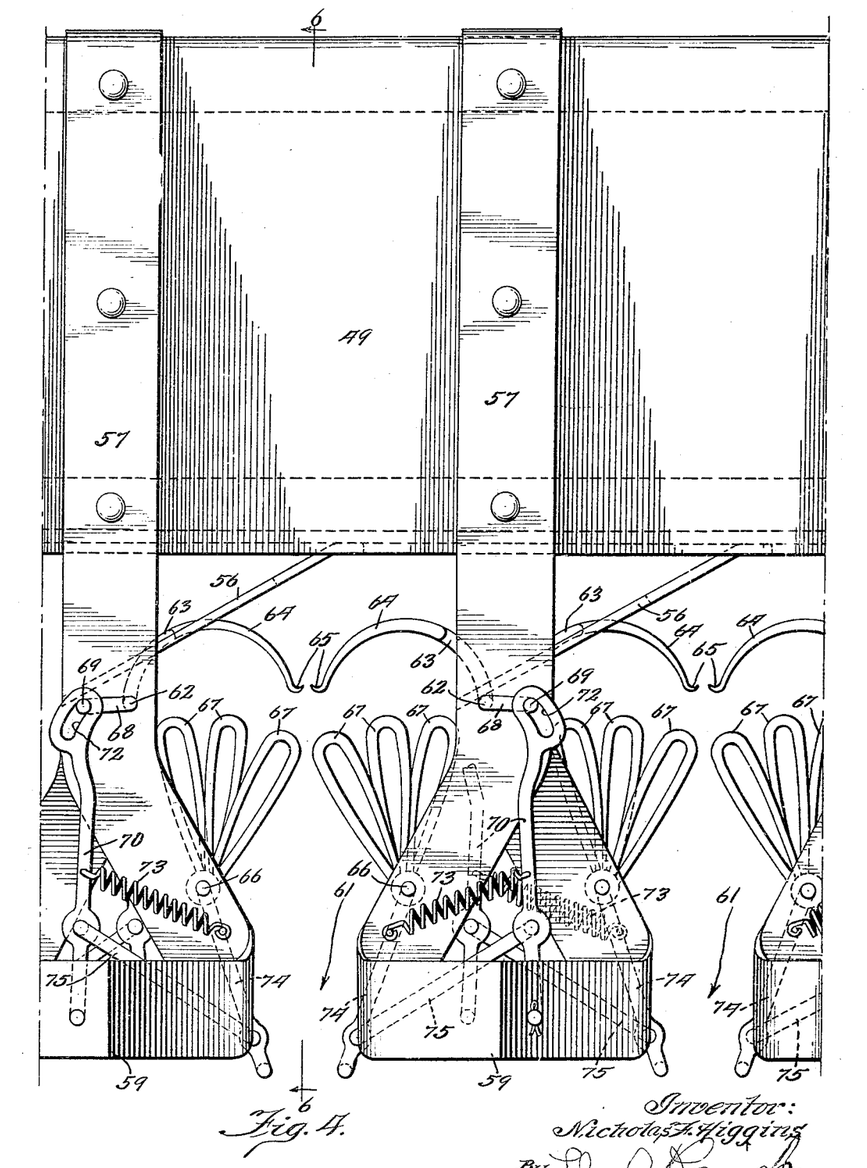
Figure 4 shows a fragmentary front elevational view of one of the boll picker stages on enlarged scale as compared to Figures 1, 2, and 3, the parts being shown in their normal or initial position.
Figure 5:
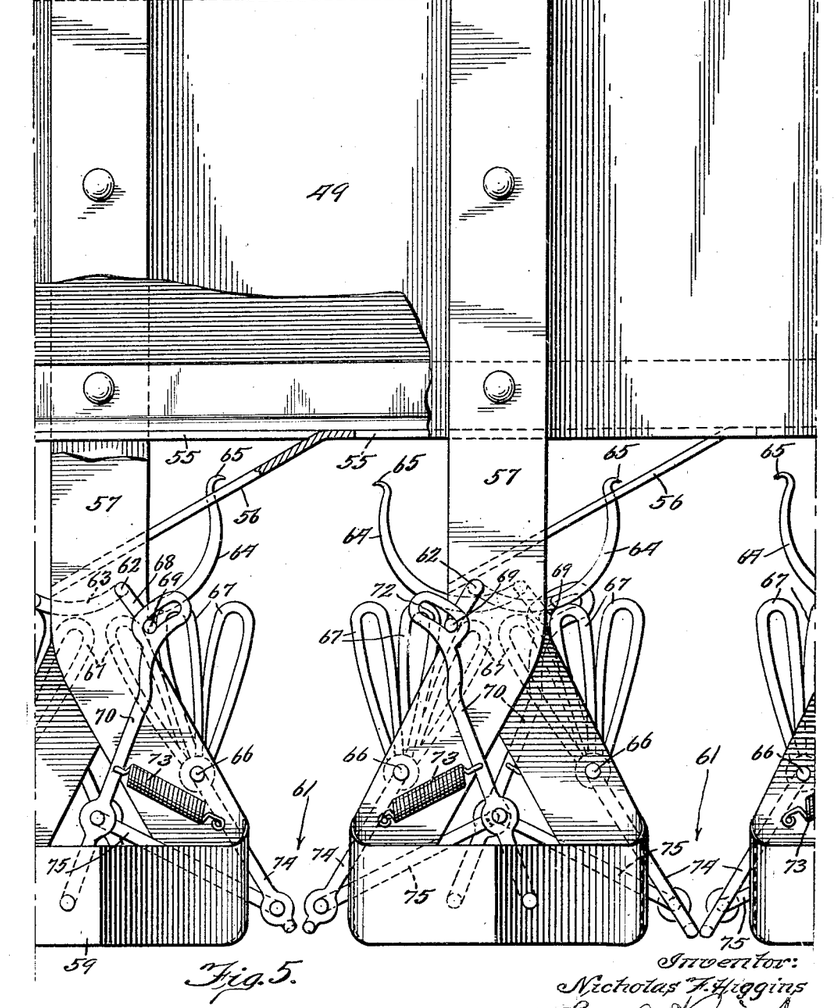
Figure 5 shows a view similar to that of Figure 4, but with the parts shifted into the picking position; and with the lower ends of the arms slightly separated to occupy such a position as they occupy when a twig or stem is between them.
Figure 6:
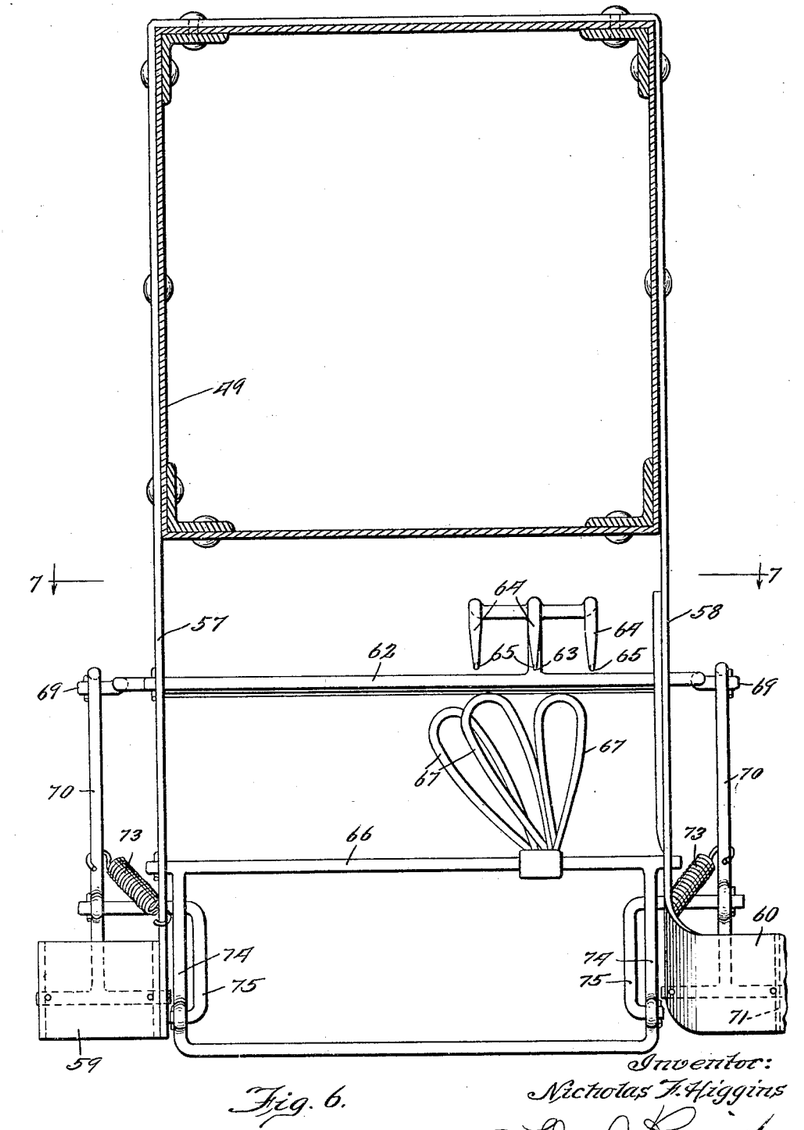
Figure 6 shows a cross section on the line 6—6 of Figure 4 looking in the direction of the arrows.

Reference may now be had particularly to Figures 4, 5, 6, and 7. From these it will be observed that each of the flues 49, 50, 51, 52, or 53 (for example the flue 49 is illustrated in Figures 4, 5, and 6), is of generally rectangular form. At various spacings along its bottom sides it is provided with openings 55 of size sufficient to permit the cotton bolls to readily be drawn up through them into the flue. Preferably these openings are also guarded by upwardly slanting lugs or plates 56 which are conveniently formed from the metal struck down from the bottom sheet of the flue itself to the desired angle of incline. Due to the suction existing within the flue there is a heavy uprush of air through the openings 55 tending to draw the bolls up through said openings and into the flue; and this current of air will also carry the bolls along through the flue into the corresponding chamber 25.

The lower edges of the lugs or plates 56 are separated from each other and are so spaced as to leave vertical openings between them corresponding more or less to the natural spacing of the bolls in their distribution throughout the plant. Therefore, as the machine travels along the field each boll sooner or later comes into close proximity to one of the openings and is accordingly subjected to the influences of the inrushing current of air.

Figure 7:
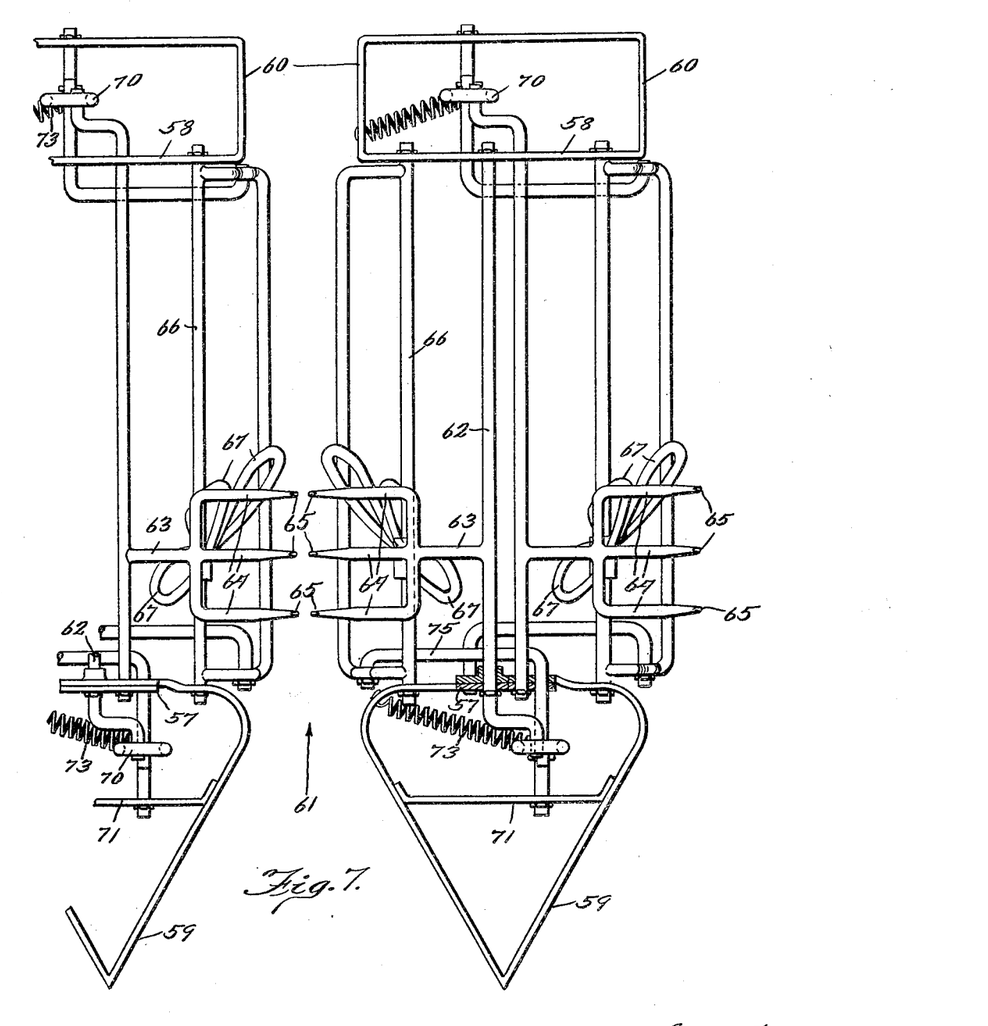
Figure 7 shows a plan view on the line 7—7 of Figure 6 looking in the direction of the arrows.

Each of the flues is provided with a pair of downwardly depending bracket arms 57 and 58 on front and back faces. These arms are preferably aligned with the lower edges of the lugs or plates 56 as best shown in Figures 4 and 5. Furthermore, the lower portions of said bracket arms are preferably doubled or folded around in a peculiar shape as best shown in Figure 7 so as to establish at the lower end of the front arm 57 a pointed section 59 and at the lower end of the bracket arm 58 a rectangular section 60. These pointed sections 59 assist the forwardly advancing brackets in working between the branches of the plants by pressing said branches sidewise and allowing the machine to advance without damage to the plant or to the bolls. These pointed sections 59 are furthermore so spaced as to leave between them openings 61 as shown in Figures 4, 5, and 7 in particular.

It will be noted that between the consecutive downwardly extending brackets there are provided boll pockets as best shown in Figures 4 and 5. These are of size and spacing corresponding generally to the size and spacing of the bolls on the plant. These boll pockets are also located below the spaces between the lower portions of the lugs 56 so that the bolls will readily find their way up from the pockets into said spaces.

Extending between each pair of brackets 57 and 58 respectively, there is a finger shaft 62 which is journaled in said lugs and can rock about a horizontal axis. These finger shafts are located in pairs and at both sides of the brackets.

Reaching inwardly towards each other from each pair of finger shafts 62 there is a fork 63 having thereon the upwardly rounded fingers 64 whose lower ends 65 are hooked upwardly on a sharp hook. When the two shafts 62 are turned into the position shown in Figures 4 and 7, the hook portions 65 approach close together, but as the shafts are rocked over and away from each other the hooked portions are carried up and drawn apart or separated from each other. For this purpose the shafts can be rocked through an angle of substantially 135° back and forth.

The rocking of the shafts with corresponding manipulation of the fingers is performed automatically by the entrance of a cotton boll into the space where the fingers will operate on it. This mechanism is as follows:

Extending lengthwise of the machine between the lower portions of the brackets 57 and 58 there are rock-shafts 66 corresponding to the shafts 62. On each rock-shaft 66 there is a fan-shaped series of bows 67 corresponding in location to the fingers 64; and the bows 67 of each group are set in a plane lying at an angle of substantially 45° across the corresponding rock shaft 66. This arrangement is best illustrated in Figure 7. In that figure it is evident that the two groups of bows reach towards each other and establish between them a V-shaped pocket into which the boll will enter due to the travel of the machine so that the rearward pressure thus created on the bows tends to swing them away from each other and thus rock the shaft 66.

There is a crank arm 68 on the front end of each of the rock-shafts 62, and having on its outer end a crank pin 69. An arm 70 has its lower end pivotally connected to the lower portion of the bracket or a cross piece 71 therein; and the upper end of each of the arms 70 is provided with an elongated slot 72 which receives the crank pin 69. A spring 73 has one end connected to the arm 70 and its other end to a pin on the lower portion of the bracket. An arm 74 reaches downwardly from the rock shaft 66; and a link 75 connects the lower portion of the arm 74 with the arm 70.

A comparison of Figures 4, 5, and 8 shows that the springs 73 normally hold the parts in such position that the fingers 64 are fully separated (see Fig. 5). The bows 67 being also fully separated, but the lower ends of the arms 74 are projected together into the position of Figure 5. The result is that as the machine travels along and the stem or substantial portions of the plant engage the lower ends of the arms 74, they are forced apart into the position of Figure 4, thus causing the fingers 64 to be projected towards each other and also causing the bows 67 to be moved over towards each other, all as indicated in Figure 4. As the machine continues its travel the fingers 67 will move up to the boll and contact against the same, thereby creating a pressure tending to separate the two groups of fingers from each other, which tendency is assisted by the tension of the spring 73. At the same time the fingers 64 tend to swing up, carrying with them the claws 65 on their ends. These claws have been effectively embedded in the fibers of the boll. Consequently there is a firm force created to pull the boll away from the plant and upwards towards the lower portion of the passage which extends up between the two lugs or plates 56. There is a heavy draft or blast flowing up through said opening and into the horizontal flue 49 so that the cotton boll is immediately carried up into said flue and disengages from the claws 65 and is carried along through the flue and into the hopper.

Due to the returning tendency of the springs 73 there is created a sufficient force to insure effective disengagement of the cotton boll from the plant.

It will be seen from Figure 1 in particular that the different flues 49, 50, 51, 52 and 53 are set at such consecutive stages or elevations that practically all portions of the plant are subjected to the influence of the picker claws.

Examination of Figure 3 also shows that there are two groups of these devices, one in advance of the other. Consequently, any bolls which may perchance not be removed by the first group, will be subjected to the action of the second group. Thus the operation of the machine is made doubly effective. Furthermore, the flues of the consecutive tiers are backwardly displaced with respect to each other so that the effectiveness of the operation is in this way still further improved.

It will sometimes happen that some of the bolls or portions of them will get knocked off and drop down. In order to insure collection of any such material I prefer to place a pan along the lower portion of the machine at each side of the passage 54 into which pan such material will fall and from which it may be collected. For this purpose the bracket arms 76 and 77 reach inwardly towards each other along the lower portions of the side sections 10 and 11, and the pans 78 and 79 are supported by these brackets. These pans are preferably provided with depressed portions or pockets 80 as best shown in Figure 3. Any bolls which fall down and are not properly taken up by the pickers will collect in these pans and work towards the pockets 80.

I provide downwardly extending flue branches 81 and 82 at each side of the machine reaching downwardly from the flues 22 and 42 respectively and terminating close to the pockets 80. These flues will therefore draw in any material which collects in the pockets and said material will be carried up and delivered into the hoppers and collected therein.

While I have herein shown and described only a single embodiment of the features of my present invention, still I do not intend to limit myself thereto except as I may do so in the claims.

I claim:

1. In a machine of the class described, the combination of a pair of side sections, each including suitable ground travelling and supporting devices, said sections being separated from each other at their lower portions a distance to correspond to the rows of plants to be picked, means for joining together the upper portions of said sections above the plants of a row being picked, each section including a receiving hopper in its rear portion, a longitudinally extending flue, a plenum blower for the front end of said flue and a suction blower for the rear end of said flue, said suction blower delivering into the hopper of the corresponding section, means for driving all of said blowers at constant speed, means for driving the ground travelling devices at variable speed, a pair of upwardly and rearwardly extending flues in each section, the upper ends of said flues terminating in the longitudinally extending flue of the corresponding section, a series of transverse horizontally extending flues in each section having their inner ends in communication with the upwardly and rearwardly extending flues of such section, the lower-most horizontally extending flues of the two sections approaching each other without contact to thereby establish a longitudinally extending passage between the flues of the two sections, the upper-most horizontally extending flues of the two sections being continuous between the two sections, there being a series of boll openings in the lower portion of each horizontally extending flue section, together with means adjacent to each of said openings operative effectively to remove bolls from the plant and deliver the same into the flue openings to be there subject to the current of inflowing air, substantially as described.

2. In a machine of the class described, the combination of a pair of side sections, each including suitable ground travelling and supporting devices, said sections being separated from each other in their lower portions a distance to correspond to the rows of plants to be picked, means for joining together the upper portions of said sections above the plants of a row being picked, each section including a receiving hopper in its rear portion, a longitudinally extending flue, a plenum blower for the front end of said flue and a suction blower for the rear end of said flue, said suction blower delivering into the hopper of the corresponding section, means for driving all of said blowers, means for driving the ground travelling devices, a pair of upwardly and rearwardly extending flues in each section, the upper ends of said flues terminating in the longitudinally extending flue of the corresponding section, a series of transverse horizontally extending flues in each section having their inner ends in communication with the upwardly and rearwardly extending flues of such section, the lower-most horizontally extending flues of the two sections approaching each other without contact, to thereby establish a longitudinally extending passage between the flues of the two sections, the upper-most horizontally extending flues of the two sections being continuous between the two sections, there being a series of boll openings in the lower portion of each horizontally extending flue section, together with means adjacent to each of said openings operative effectively to remove bolls from the plant and deliver the same into the flue openings to be there subject to the current of inflowing air, substantially as described.

3. In a device of the class described, the combination of a hopper, means for causing the same to travel over a field to be picked and parallel to a row of plants, a longitudinally extending flue, a plenum blower for delivering a current of air into one end of said flue, a vacuum blower for withdrawing material from said flue and delivering the same into the hopper, means for driving both of said blowers, a series of flues reaching upwardly and rearwardly and having their upper ends terminating in the longitudinally extending flue, said upwardly and rearwardly extending flues lying in a plane substantially parallel to the direction of travel, a series of transverse horizontally extending flues in connection with said upwardly and rearwardly extending flues and delivering into them, there being a series of inlet openings in the bottom of each of said horizontally extending flues, a downwardly slanting flange beneath each of said openings, front and rear downwardly extending lugs supported by each of the horizontally extending flues at positions adjacent to the bottom openings thereof, relatively pointed forwardly projecting head portions on the forward-most lugs, adapted to ride through the plants to be picked, a pair of longitudinally extending finger shafts journaled in the downwardly depending lugs adjacent to each of the flue openings, arcuate fingers carried by said finger shafts and arching upwardly and over towards each other when in the picking position, relatively sharp claws on the ends of said fingers, other bow shafts journaled between the lower portions of the downwardly depending lugs and adjacent to the finger shafts aforesaid, bows on said bow shafts, operating connections between the bow shafts and the finger shafts operative effectively to insure approach and recession of the bows towards and from each other harmoniously with approach and recession of the fingers towards and from each other, spring means normally tending to separate the bows and fingers from each other, and downward projections from the bow shafts normally standing in proximity to each other while the bows and fingers are separated, and operative to cause the bows and fingers to come together when a portion of the plant enters between said projections, substantially as described.

4. In a machine of the class described, the combination of a hopper, a flue having its delivery end in communication therewith, suitable blowing mechanisms in conjunction with said flue to establish a current of air therethrough into the hopper, a series of upwardly and rearwardly extending flues having their upper ends in communication with the first mentioned flue, said upwardly and rearwardly extending flues lying in a vertical plane parallel to the direction of travel of the machine, a series of transverse horizontally extending flues terminating in the upwardly and rearwardly extending flues, there being bottom boll receiving openings in the horizontally extending flues, downwardly inclined flanges beneath said boll receiving openings, a pair of horizontally extending finger shafts beneath each boll receiving opening, fingers on said shafts, said fingers curving upwardly and over towards each other when in boll engaging position, hooks on the inner ends of said fingers, a pair of bow shafts beneath each pair of finger shafts aforesaid, bows on the bow shafts, operative connections between the bow shafts and the finger shafts operative effectively to move the bows and fingers towards and from each other harmoniously, downwardly extending projections connected to the bow shafts and normally standing in close proximity to each other when the bows and the fingers are relatively separated from each other, and springs normally holding the parts in said position, whereby the entrance of a plant between said projections causes them to separate with corresponding approach of the bows and the fingers towards each other to thereby cause the fingers to engage the boll for subsequent disengagement of the boll from the plant, substantially as described.

5. In a machine of the class described, the combination of a horizontally extending flue having a series of boll openings along its lower portion, suitable connections and means causing a current of air to flow into said flue through said openings, a downwardly inclined flange plate beneath each of said openings, a pair of finger shafts located beneath each opening, fingers on said shafts, said fingers curving upwardly and over towards each other when in the picking position, bow shafts located beneath the finger shafts, bows on said bow shafts, operative connections between each bow shaft and the corresponding finger shaft operative effectively to cause the bows to approach towards and recede from each other harmoniously with corresponding movements of the fingers, downwardly extending projections in conjunction with the bow shafts but moving in opposition to the movements of the bows and fingers, together with springs normally tending to move the projections towards each other with consequent separation of the bows and fingers, substantially as described.

6. In a device of the class described, the combination of a horizontal flue and a series of inlet openings along its lower portion, means for causing a flow of air through said openings into the flue, a pair of finger shafts beneath each opening, fingers on said shafts, said fingers moving towards and from each other with arcuate movements substantially above the horizontal plane which includes the finger shafts, boll engaging hooks on the ends of the fingers, bow shafts beneath the finger shafts, bows on said shafts, operative connections between the bow shafts and the finger shafts operative effectively to cause the bows to approach towards and recede from each other harmoniously with corresponding movements of the fingers, downward projections in conjunction with the bow shafts, operative to approach towards and recede from each other in opposition to the corresponding movements of the bows and the fingers, together with spring means operative to normally retain the projections close together with the bows and fingers correspondingly separated, substantially as described.

7. In a machine of the class described, the combination of a carriage mounted for travel through a field during the picking operation, and having a horizontal flue having a series of boll openings in its lower portion, means for causing the flow of air through said openings into and through the flue, to thereby carry disengaged bolls through the openings into the flue, together with means for mechanically and positively disengaging the bolls from the plant and presenting them to the flue openings, said mechanisms including fingers swingingly mounted effectively to rotate about centers of rotation beneath the openings and substantially above the horizontal planes passing through said centers of rotation, said fingers having end hooks for engagement with the bolls, bows beneath the fingers mounted effectively to swing back and forth towards and from each other beneath the positions of the fingers and transversely with respect to the travel of the machine, operative connections between the bows and the fingers operative effectively to cause the bows to approach towards and recede from each other harmoniously with corresponding movements of the fingers, downward projections from the bows, said projections approaching towards and receding from each other in opposition to the corresponding movements of the bows and fingers, and spring means normally tending to retain the projections in close proximity to each other, substantially as described.

8. In a machine of the class described, the combination of a carriage mounted for travel through a field during the picking operation, and having a horizontal flue having a series of boll openings in its lower portion, means for causing the flow of air through said openings into said flue, to thereby carry disengaged bolls upwardly through said openings into the flue for transportation therein by a current of air, together with means for mechanically and positively disengaging bolls from the plant and delivering them into the openings of the flue, said means including fingers mounted for swinging movement upwardly towards the flue openings, said fingers being suitably formed for mechanical engagement with the bolls, together with bows beneath the fingers mounted for lateral movement across the path of travel of the machine, operative connections between the bows and the fingers operative effectively to cause the bows to move towards and from each other harmoniously with similar movements of the fingers, downward projections in conjunction with the bows, said projections approaching towards and receding from each other in opposition to the corresponding movements of the fingers and bows, together with spring means normally tending to retain the projections in proximity to each other with the fingers and the bows correspondingly separated from each other, substantially as described.

NICHOLAS F. HIGGINS.